United States Patent [19]
Carpenter et al.

[11] Patent Number: 5,910,799
[45] Date of Patent: Jun. 8, 1999

[54] LOCATION MOTION SENSITIVE USER INTERFACE

[75] Inventors: Mark Alan Carpenter; David Bruce Lection, both of Raleigh; Mark Edward Molander, Cary, all of N.C.

[73] Assignee: International Business Machines Corporation, Armonk, N.Y.

[21] Appl. No.: 08/629,716

[22] Filed: Apr. 9, 1996

[51] Int. Cl.[6] .................................................. G06F 13/00
[52] U.S. Cl. ........................................ 345/333; 345/329
[58] Field of Search ...................................... 345/333, 335, 345/329, 331, 334, 338, 337, 339, 340, 341, 342, 343, 344, 345, 346, 347, 348, 349, 350, 351, 352, 336, 330

[56] References Cited

U.S. PATENT DOCUMENTS

| | | | |
|---|---|---|---|
| 5,493,692 | 2/1996 | Theimer et al. | 455/26.1 |
| 5,544,321 | 8/1996 | Theimer et al. | 395/200.56 |
| 5,555,376 | 9/1996 | Theimer et al. | 395/200.56 |
| 5,603,054 | 2/1997 | Theimer et al. | 395/200.56 |
| 5,611,050 | 3/1997 | Theimer et al. | 395/200.56 |
| 5,642,303 | 6/1997 | Small et al. | 364/705.05 |
| 5,758,074 | 5/1998 | Marlin et al. | 395/200.8 |

FOREIGN PATENT DOCUMENTS 0769751   4/1997   European Pat. Off. ........ G06F 17/60

OTHER PUBLICATIONS

"Mechanism to Automate National Language Configuration", IBM Technical Disclosure Bulletin, vol. 36, No. 9B, Sep. 1, 1993, pp. 113–114.

"Automated Configuration for Country Specific Software Packages", IBM TDB, vol. 36, No. 10, Oct. 1, 1993, p. 379.

Patent Abstracts of Japan, vol. 018 No. 275 (E–1553), May 25, 1994 & JP 06 046179 A, Feb. 1994.

Patent Abstracts of Japan, vol. 096, No. 010, Oct. 31, 1996 & JP 08 146116 A (Matsushita Electric Ind Co Ltd), Jun. 7, 1996.

Patent Abstracts of Japan, vol. 095, No. 006, Jul. 31, 95, Jul. 31, 1995 & JP 07 085060 A (Matsushita Electric Ind Co Ltd), Mar. 31, 1995.

Patent Abstracts of Japan, vol. 096, No. 001, Jan. 31, 1996 & JP 07 234784 A (Sega Enterp Ltd), Sep. 5, 1995.

"Methodology to Prevent Video and Software Piracy", IBM TDB, vol. 36, No. 10, Oct. 1993, pp. 199–200.

*Primary Examiner*—Raymond J. Bayerl
*Assistant Examiner*—Steven P. Sax
*Attorney, Agent, or Firm*—Jeanine S. Ray-Yarletts

[57] ABSTRACT

A method, data processing system and program product for providing a location sensitive user interface by acquiring a geographic location of the portable data processor and selecting a user interface environment associated with the acquired location of the portable data processor. The selected user interface environment is activated as the user interface environment of the portable data processor. The portable data processor may also determine if it is in motion. A user interface environment associated with the portable data processor being in motion is then selected and activated. Location sensitive data may also be provided based upon the acquired location of the portable data processor. The location of the portable data processor may be acquired from an automated position sensing system.

51 Claims, 10 Drawing Sheets

5,910,799

LOCATION MOTION SENSITIVE USER INTERFACE

FIELD OF THE INVENTION

The present invention relates generally to mobile computing. More particularly, the present invention relates to user interfaces for portable data processors such as laptop computers.

BACKGROUND OF THE INVENTION

In recent years, decreasing power requirements and increased performance of microprocessors has lead to increased use of portable data processors such as a laptop computers, notebook computers or personal data assistants (PDAs). Portable data processors provide much, if not all, of the functionality of the older, immobile desktop computers but add portability as a feature. In fact, advances in display technology have made high resolution, low power, color or monochrome displays commonplace on portable computers which has furthered the replacement of desktop systems with portable systems. As portable data processors have taken the place of many desktop computers they have changed the perception of computers from a back room appliance used by data processors to an interactive tool accessible to anyone.

Even though portable data processors were put to new and different uses by new and different users, the same user interfaces which were used in stationary desktop computing were generally brought to portable data processors. The stationary desktop computer's user interface paradigm involved providing a general purpose operating system which allowed for access to any application that was available from the processor. Thus, desktop units have a very generic and abstract user interface which will work in all situations for all types of applications.

At the same time that technological advances in the computer industry brought ever increasing mobility to computers, demand for increased productivity among the workforce has brought more employees in contact with computers. This contact may be in the form of a portable computer such as a notebook computer or it may be in the form of a more customized processing application such as a PDA. As described above, despite the proliferation of mobile computing among an ever less computer trained user pool, the user interface for portable data processors has generally remained the generic desktop interface. The generic, multi-purpose nature of these user interfaces for portable data processors assumes some level of familiarity and experience with computers which is less and less present among mobile computer users. Thus, more people with less computer training are required to operate computers with a more generic, abstract and intimidating user interface. Furthermore, even if training is available, quite often these users are in high turn-over positions which presents efficiency and productivity difficulties if extensive training is required before a new user can become productive. Also, in many instances, this disparity between the experience and training level of the user and the capabilities of the portable data processor naturally leads to intimidation and an unwillingness to take full advantage of the capabilities of the portable data processor. Thus, there is a need for improvements in user interfaces of portable data processor devices to allow greater access to portable data processors by users of all types of experience and training levels.

OBJECTS AND SUMMARY OF THE INVENTION

In view of the above limitations of existing user Interfaces, it is an object of the present invention to provide a user interface which reduces the complexity of operating a portable data processor and, thereby, reduces the intimidation felt by users of portable data processors.

A second object of the present invention is to provide a user interface which emphasizes appropriate selections and makes data more accessible to the user.

A further object of the present invention is to provide a user interface which reduces the likelihood of user error.

An additional object of the present invention is to increase user productivity by reducing the amount of training required to use a portable data processor.

It is another object of the present invention to provide a user interface which reduces the amount of prior experience and knowledge of computer systems required to operate the computer system.

These and other objects of the present invention are provided by a method, data processing system or program product which provides a user interface for a portable data processor. A location sensitive user interface is provided by acquiring a geographic location of the portable data processor and selecting a user interface environment associated with the acquired location of the portable data processor. The selected user interface environment is activated as the user interface environment of the portable data processor. In an additional aspect of the present invention, the portable data processor determines if it is in motion. A user interface environment associated with the portable data processor being in motion is then selected and activated. Location sensitive data may also be provided based upon the acquired location of the portable data processor.

The location of the portable data processor may be acquired by accepting user input specifying the location of the portable data processor. Alternatively, the location of the portable data processor may be acquired through an automated position sensing system. In such an embodiment, a global positioning system may be utilized as the automated position sensing system.

In a more automated aspect of the present invention, a user interface environment is created based upon a historical use of software applications at a specific location. Selection of a user interface environment may also be prevented based upon the acquired location of the portable data processor.

Additionally, a software application may be selected as the user interface environment associated with the acquired location of the portable data processor. The user interface environment may then be activated by launching an instance of the selected software application.

When the user interface environment comprises a graphical user interface environment having icons associated with software applications, the user interface environment associated with the acquired location of the portable data processor may be selected from a preselected group of application icons associated with the acquired location of the portable data processor. The user interface environment is activated by incorporating in the graphical user interface environment the selected preselected group of application icons associated with the acquired location of the portable data processor.

As will be appreciated by those of skill in this art, the above described aspects of the present invention may also be provided as apparatus or computer readable program instruction means.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Figure 1:
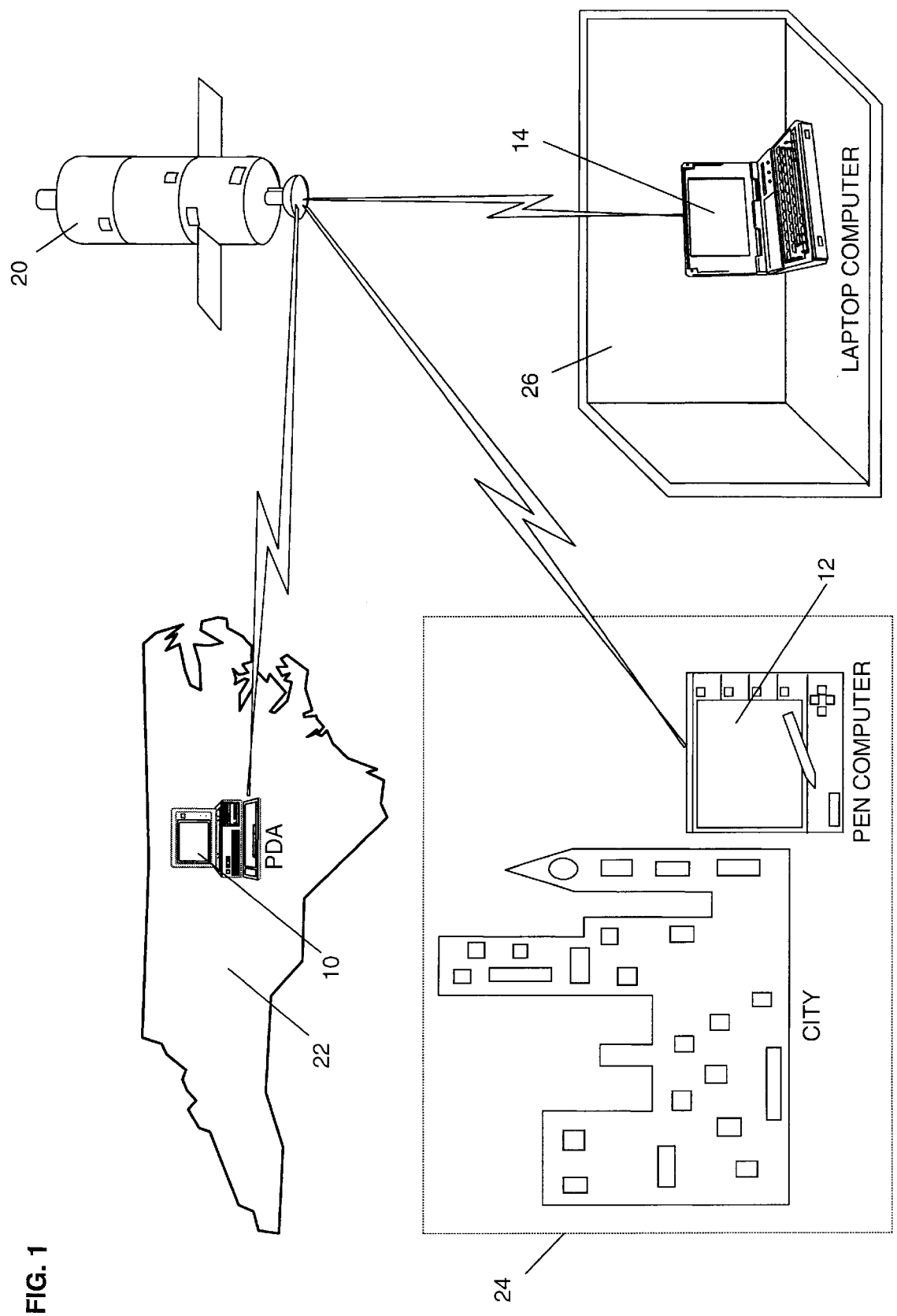
FIG. 1 is a logical diagram of a system utilizing the present invention.

The present invention provides a user interface environment for a portable data processor. According to the present invention, a portable data processor acquires the geographic location of the portable data processor and selects a user interface environment associated with the acquired location of the portable data processor. This selected user interface environment is then activated as the user interface environment of the portable data processor. Thus, as seen in FIG. 1, a portable data processor, such as a PDA 10, may acquire its geographic location, such as in the State of North Carolina 22, from a satellite positioning system illustrated as the satellite 20 in FIG. 1. Based upon the acquired geographic location of the portable data processor 10, the portable data processor 10 can select the appropriate user interface environment for its geographic location. For example, the PDA could call up specific applications associated with the State of North Carolina and provide those applications in an highly accessible manner to the user.

Likewise, the pen-based computer 12 may also acquire its geographic location, such as in a city 24, from the satellite positioning system 20. Based upon the acquisition of its geographic location, a portable data processor such as the pen-based computer 12 would select the appropriate user interface environment associated with the city environment and activate the selected user interface environment as the user interface environment of the pen-based computer 12. Finally, as a further illustration of the method of the present invention, a laptop computer 14 may be a portable data processor according to the present invention and may acquire its location from a satellite positioning system 20 or other type of geographic positioning system and from that acquired geographic location determine that it is in a particular room 26. Based upon its knowledge that the laptop computer 14 is in a particular room 26, a user interface environment associated with that room would be selected and activated as the user interface environment of the laptop computer 14.

As used herein, the term "user interface" means the human-processor interface of the portable data processor. For example, a desktop with icons representing applications would be one example of a graphical user interface (GUI) such as that utilized by Apple® Macintosh®, Windows®, or OS/2® operating systems. Other types of user interfaces suitable for use in the present invention include interfaces such as the 3-D interface of Microsoft® BOB® or General Magic's Magic Cap. These 3-D interfaces are particularly well suited for use with the present invention because they represent different functions based upon visual representations of the locations of those functions. While the present invention is described herein with reference to a graphical user interface, as will be appreciated by one of skill in the art, the methods, apparatus and program product of the present invention are equally applicable to other types of user interfaces such as voice controlled user interfaces or character based user interfaces.

As used herein, the term "user interface environment" refers to a particular state of a user interface. For example, in the desktop user interface paradigm a user interface environment may be a particular desktop with particular icons displayed on that desktop. The user interface environment could then be changed by either altering the icons displayed on the desktop or by launching an instance of an application such that the user interface environment becomes that of the application launched. Accordingly, in addition to changes to the graphic user interface elements of a graphic operating system, a software application may be selected as the user interface environment for an acquired geographic location of a portable data processor. In such a case the selected user interface environment could then be activated by launching an instance of the selected software application. Likewise, in a graphical environment having icons associated with software applications a preselected group of application icons associated with an acquired location of the portable data processor could be selected as the user interface environment for the portable data processor. This selected user interface environment could then be activated by incorporating in the graphical user interface the selected preselected group of application icons.

As used herein the term "portable data processor" refers to any type of portable data processor or computer having a user interface for human interaction with the processor. Examples of portable data processors would include PDA's, pen-based computers, laptop computers or dedicated processors for specific tasks such as electrical or utility meter reading or the like.

In selecting a user interface environment associated with an acquired location, the portable data processor may change certain aspects of the user interface environment to make the environment more appropriate for the acquired location. For example, the overall look and feel of the environment may change as the location of the portable data processor changes. Alternatively, certain applications may be made more prominent or more accessible to the user based upon the location of the portable data processor. Also, location sensitive data may be provided to the user based upon the location of the portable data processor. The user may also be prevented from utilizing certain applications or accessing certain data based upon the location of the portable data processor. Thus, activation of a user interface environment or elements of an environment may be prevented based upon the acquired location of the portable data processor.

As will be appreciated by one of skill in the art, various combinations of the above elements of user interface environments may be selected to provide the optimal user interface environment for ease of use in a particular location. This could include prioritizing applications which are accessible to the user making more frequently used applications more readily accessible while making less utilized or marginally useful applications less accessible. Also, for security and other reasons, the user could be prevented from having access to applications or user interface environments if the geographic location acquired by the portable data processor is not considered a secure location.

The present invention is based upon the acquisition of the geographic location of a portable data processor. Many techniques are available for acquisition of the geographic location of a portable data processor. The technique selected for a particular application will depend upon the location resolution required for the application and the amount of location sensing infrastructure which is justifiable for the particular application. For example, an extensive infrastructure exists which allows a portable data processor to determine its location on the face of the earth through global positioning satellite systems. However, if the location resolution required for a particular application is higher than available from a global positioning system, more refined methods of acquiring the portable data processor's location may be necessary.

One technique for acquiring the geographic location of the portable data processor is by accepting user input specifying the location of the portable data processor. For example, a user may be prompted to input the location of the portable data processor or to select the portable data processor location from a list of possible locations. This system has cost and hardware advantages. Depending on the resolution required for the location of the portable data processor, the acquisition of the location may be automated using an automated position sensing system such as the Global Positioning System or GPS. GPS cards are readily available for laptop computers and provide locations of the computer within about 10 feet for civilian applications and with even greater resolution for military applications. In the event that higher resolution of the geographic location of the portable data processor is required, specific automated position sensing systems may be implemented at a particular location. Various methods of accurately determining the position or location of a portable data processor are known to those of skill in the art. Examples of these methods include radio frequency (RF) or infrared (IR) transmitters located at specific locations and an RF or IR receiver associated with the portable data processor. In addition to acquiring the two-dimensional location of a portable data processor, the geographic location may also include the three dimensional location of the portable data processor, which would include an altitude or depth component. Thus, a user interface could be selected based upon the portable data processor being on a particular floor of a building, an altitude in the air or a depth in the sea.

To minimize the amount of user training required to operate systems utilizing the present invention, the association of user interface environments with geographic locations may be preloaded in the portable data processor by a system administrator. Alternatively, for more advanced users, the association of a user interface environment with a location may be created or modified by the user to further increase the usability of the user interface. In a more automated embodiment of the present invention, the user interface environment associated with a geographic location may be created automatically based upon historical use of software applications at a geographic location. For example, the use of a flight directory at an airport could be recorded and, if used often enough at a location, the user interface environment associated with the airport location could be updated to launch the flight program or to make it more accessible. Additionally, if the portable data processor has access to information which categorizes geographic locations, such as the geographic locations of all airports in the United States, the user could be asked if they would like the flight program to also be incorporated in the user interface environment for all geographic locations of the same type. Thus, the user interface environment associated with various locations may be dynamically configured automatically through user input or through a combination of user input and automation.

By acquiring the location of the portable data processor over time it is possible for the portable data processor to determine if the portable data processor is in motion. In fact, if the frequency of acquisition of the geographic location of the portable data processor is high enough it is even possible to determine the approximate velocity or acceleration of the portable data processor when it is in motion. For example, if the portable data processor automatically acquires its location every 5 seconds, then the processor may calculate the difference in location and divide that distance by the 5 second acquisition interval to determine the processor's approximate velocity. Through successive determinations of velocity the acceleration of the portable data processor may also be obtained.

Velocity or acceleration information can be used to select and activate a user interface environment based upon the portable data processor being in motion and could even be used to determine the approximate mode of transportation being utilized. For example, if the processor determines that its velocity is greater than 300 miles per hour then it could safely assume that the portable data processor was traveling in an airplane. The portable data processor could then select and activate a user interface based upon the portable data processor being in an airplane and even prevent access to certain applications or data while the portable data processor was traveling in the airplane. Thus, the portable data processor could determine if the location was an unsecured location, such as in an airplane, and prevent access to sensitive information and applications in such an unsecured location. When the portable data processor is returned to a location where security is not a problem, access to the information could be reestablished. Likewise, a combination of location and velocity information could be used to select a user interface environment. For example, a velocity of 20 miles per hour combined with a location indicating the portable data processor was over water could be used to select a user interface environment suitable for a boat or ship. As will be appreciated by one of skill in the art, numerous other combinations of velocity, location or acceleration could be used to select an appropriate user interface environment associated with the situation having those characteristics.

Figure 2:
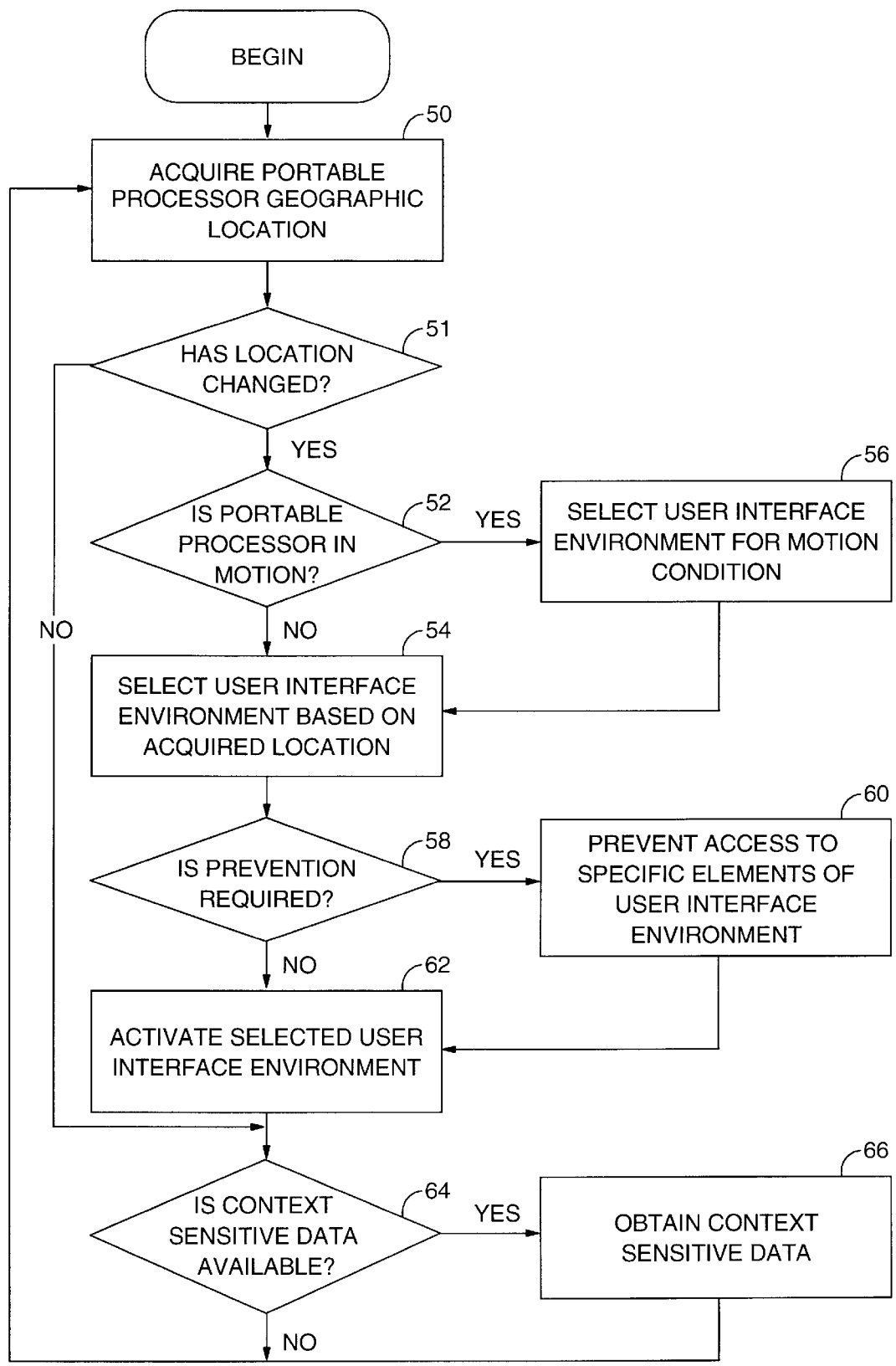
FIG. 2 is a flow chart of one particular embodiment of the present invention.

One particular embodiment of the present invention will now be described with reference to the flow charts of FIG. 2 and FIG. 3. As seen in FIG. 2, block 50 reflects the portable data processor acquiring its geographic location. After acquiring the geographic location, the portable data processor determines if the location of the portable data processor has changed as shown in block 51.

If the location of the portable data processor has changed, the portable data processor determines if the portable data processor is in motion as shown in decision block 52. As discussed above, this may be accomplished through successive acquisitions of the geographic location of the portable data processor. If the portable data processor is in motion, then the user interface environment associated with the portable data processor being in motion is selected as shown in block 56. As discussed above, the user interface environment may be selected based upon the rate of motion of the portable data processor or simply may be a user interface associated with the portable data processor being in motion.

Returning again to block 52, if the portable data processor is not in motion, then the user interface environment is selected based on the acquired location of the portable data processor as seen in block 54.

After selecting a user interface environment, the portable data processor determines if prevention of access to elements of a user interface environment is required as seen in block 58. If prevention is required, then the portable data processor prevents access to the specific elements of the user interface environment as shown in block 60. The portable data processor then activates the selected user interface environment as shown in block 62. If no prevention is required, then the portable data processor may activate the selected user interface environment as seen in block 62.

The portable data processor then determines if location sensitive data is available as shown in block 64. If no location sensitive data is available, then the portable data processor acquires the next geographic location as seen in block 50. The acquisition of the geographic location may be delayed by a specified time period or may occur once the steps shown in FIG. 2 have been completed. If location sensitive data is available, then the portable data processor obtains the location sensitive data shown in block 66. The portable data processor then acquires the geographic location of the portable data processor as shown by the return path to block 50.

Returning to block 51, if the acquired geographic location of the portable data processor indicates that the portable data processor has not changed location, then the portable data processor checks to see if location sensitive data is available as shown in block 64 and carries out the steps described above based upon whether or not location sensitive data is available.

Figure 3:
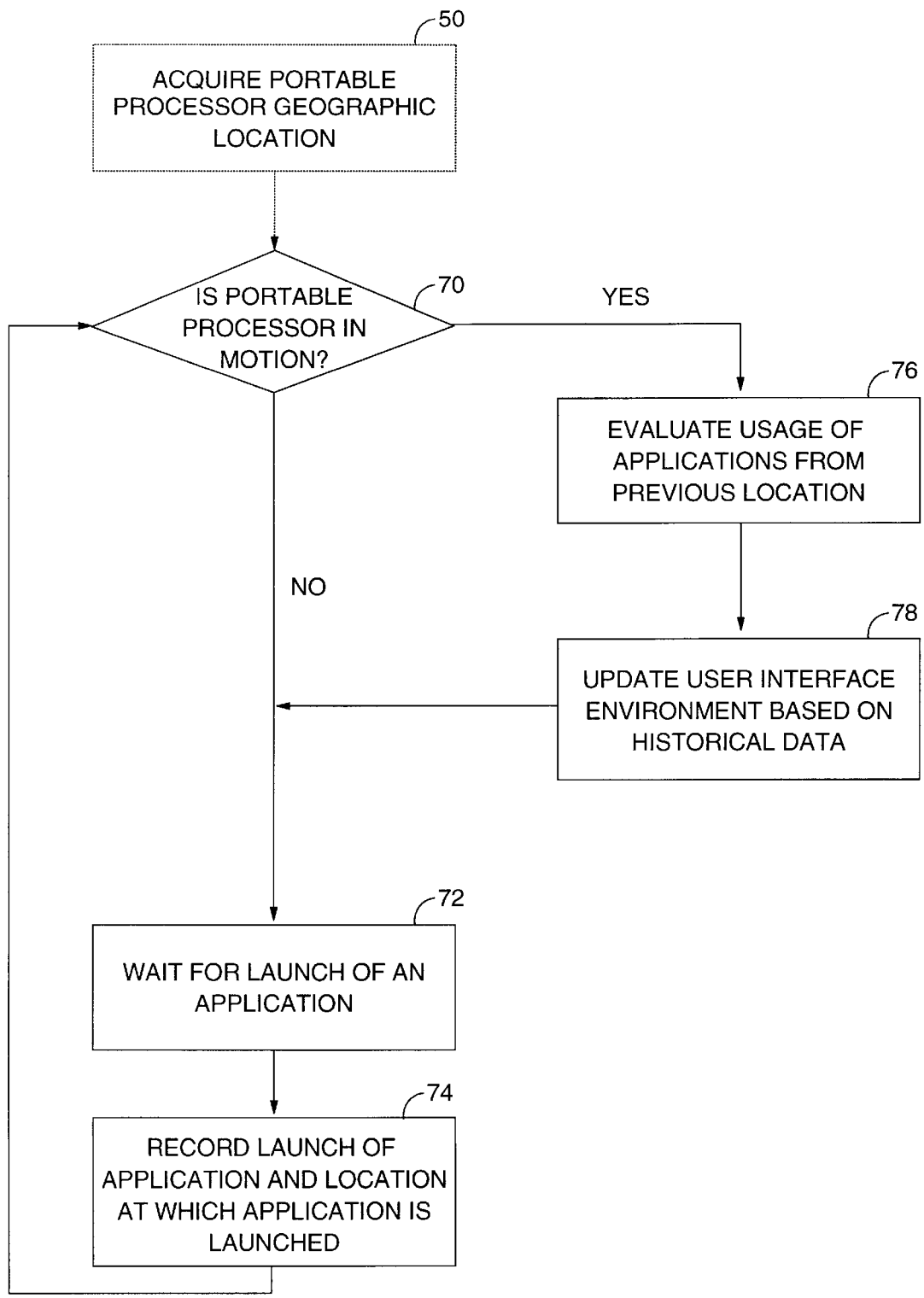
FIG. 3 is a flow chart of a historical updating aspect of the present invention.

FIG. 3 illustrates operations for updating a user interface environment automatically based on application usage at a location. The operations of FIG. 3 may be carried out simultaneously or concurrently with the operations of FIG. 2 and may be seen as a parallel path out of block 50. The operations of FIG. 3 are one method of associating a user interface environment with a geographic location. As will be appreciated by one of skill in the art, other methods of updating a user interface environment may be employed while still benefiting from the teachings of the present invention. The portable data processor may update the user interface environment associated with a particular geographic location by carrying out the operations shown in FIG. 3. As seen in block 70, the portable data processor determines whether or not the portable data processor has been moved to a new location. If the portable data processor is not in a new location, then the portable data processor waits for the launch of an application as shown in block 72. When an application is launched, the portable data processor records the fact that the application was launched and the location of the portable data processor when the application was launched. These actions are shown in block 74. The portable data processor then checks the acquired location to see if it is changed, and if it has not, again waits for the launch of any other applications at that location as shown in block 72.

Returning to block 70, when the portable data processor is moved to a new location, the portable data processor evaluates the usage of applications from the previous location of the portable data processor as shown in block 76. This evaluation of the usage of applications may be done by examining the record of launched applications at the previous location. The portable data processor then updates the user interface environment based on the use of applications at a particular location as shown in block 78. This update may increase or decrease accessibility of applications and may result from repeated use or prolonged non-use of an application. The portable data processor then waits for the launch of an application at this new location as shown in block 72. In updating the user interface environment, the update may be accomplished as discussed above with respect to the historical update of the user interface environment. As will be appreciated by those of skill in the art, minor movements in the portable data processor may or may not be viewed as a change in location of the portable data processor depending on the use of the portable data processor. For example, in the airport situation, moving from one wing to the next of an airport may change a satellite positioning value for the portable data processor but would not change the location of the data processor.

Particular applications of the present invention will now be discussed with reference to the following examples.

Figure 4:
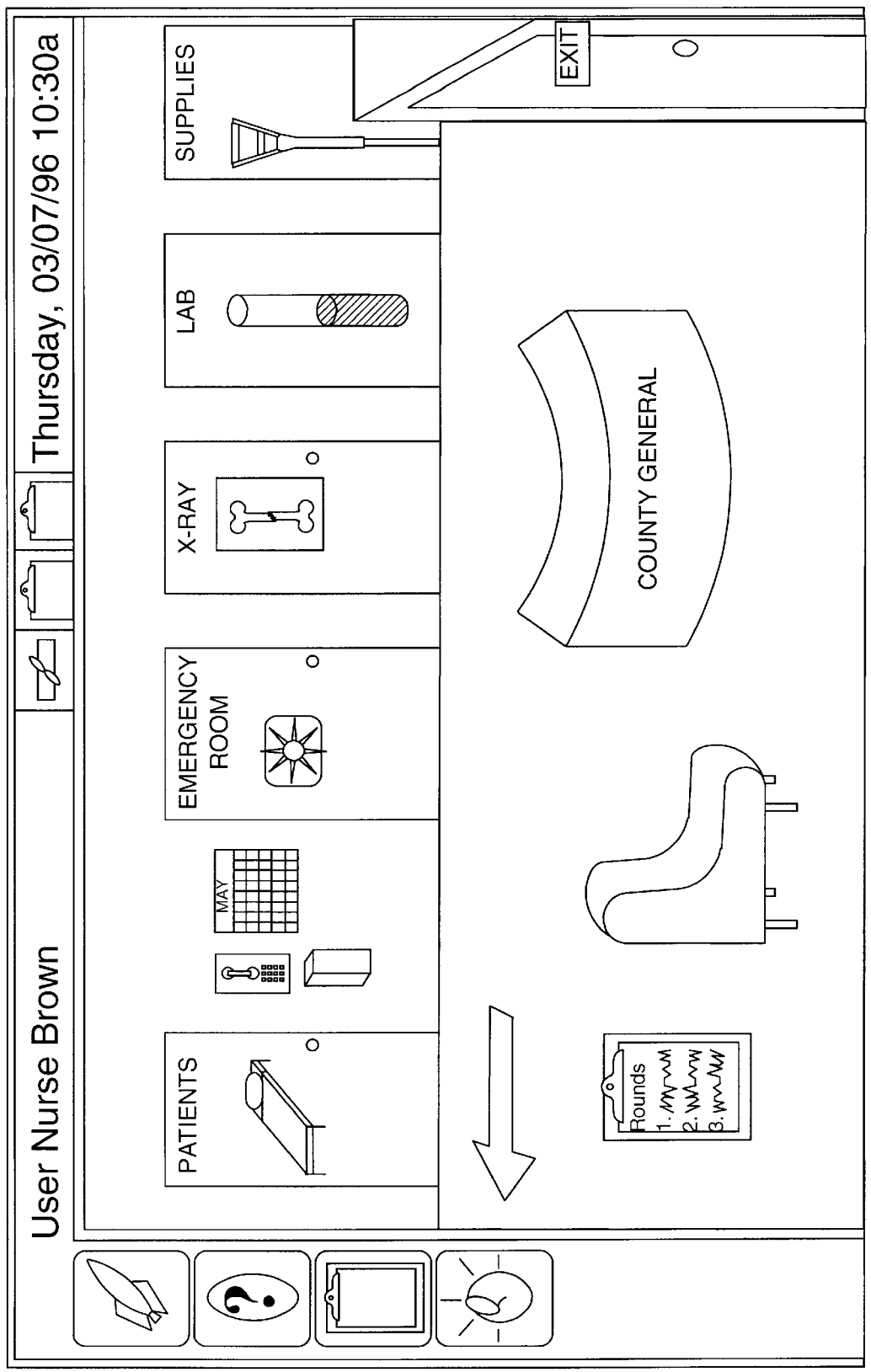
FIG. 4 is a screen capture of a first user interface according to the present invention for use in a medical environment.

FIG. 4 is an example of a possible user interface environment for use in a medical environment. The user interface environment shown in FIG. 4 would be presented to a user of a portable data processor. As seen in FIG. 4 a number of icons represent various applications or information for use by a nurse or doctor. For example, the "Supplies" door in FIG. 4 could be selected by a user to view the current inventory of supplies available or on order. Icons may be selected by any number of methods such as with a pointing device such as a mouse or with a pen device or audibly by speech recognition.

As the user of the portable data processor having a user interface environment as shown in FIG. 4 moves about the hospital, the user interface environment may change to provide a location sensitive user interface. Thus, for example, when a nurse or doctor does "rounds" the user interface environment could change from that shown in FIG. 4 to that shown in FIG. 5. When the user enters a patient's room, the portable processor could automatically detect its location as a particular room and modify the user interface environment to that shown in FIG. 5. Alternatively, the user could input the room number as they enter the room and the portable data processor could select the appropriate user interface environment.

Figure 5:
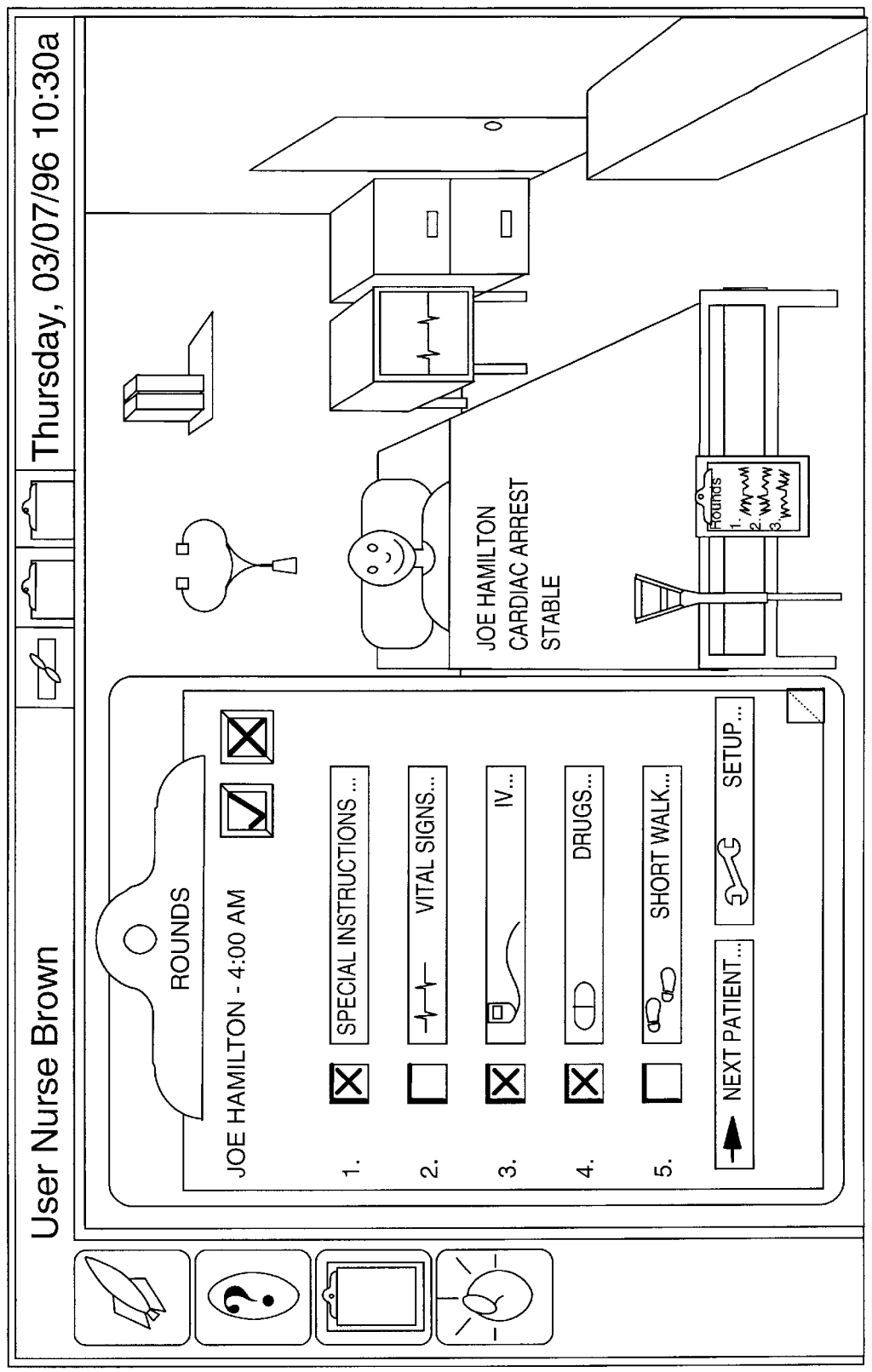
FIG. 5 is a screen capture of a modified user interface according to the present invention for use in a medical environment.

In the present example, upon acquisition of the location of the portable data processor as a patient's room, the portable data processor would display the user interface environment shown in FIG. 5. Because the portable data processor is located in a patient's room, icons of applications and data appropriate to the patient are made more accessible to the user. For example, as illustrated in FIG. 5, the data clipboard is displayed with information specific to the patient. Furthermore, icons reflecting applications which may be used in a patient's room, such as the EKG icon or the file drawer icons of FIG. 5 are made available to the user. These icons would access applications such as an EKG history of the patient or a database of the patient's medical history. The user interface environment has, therefore, been modified to make location sensitive information and applications more accessible to the user. Likewise, the previous icons of the supply room or the emergency room have been removed from the user interface environment and made less accessible as they are not appropriate for the user's present location.

Figure 6:
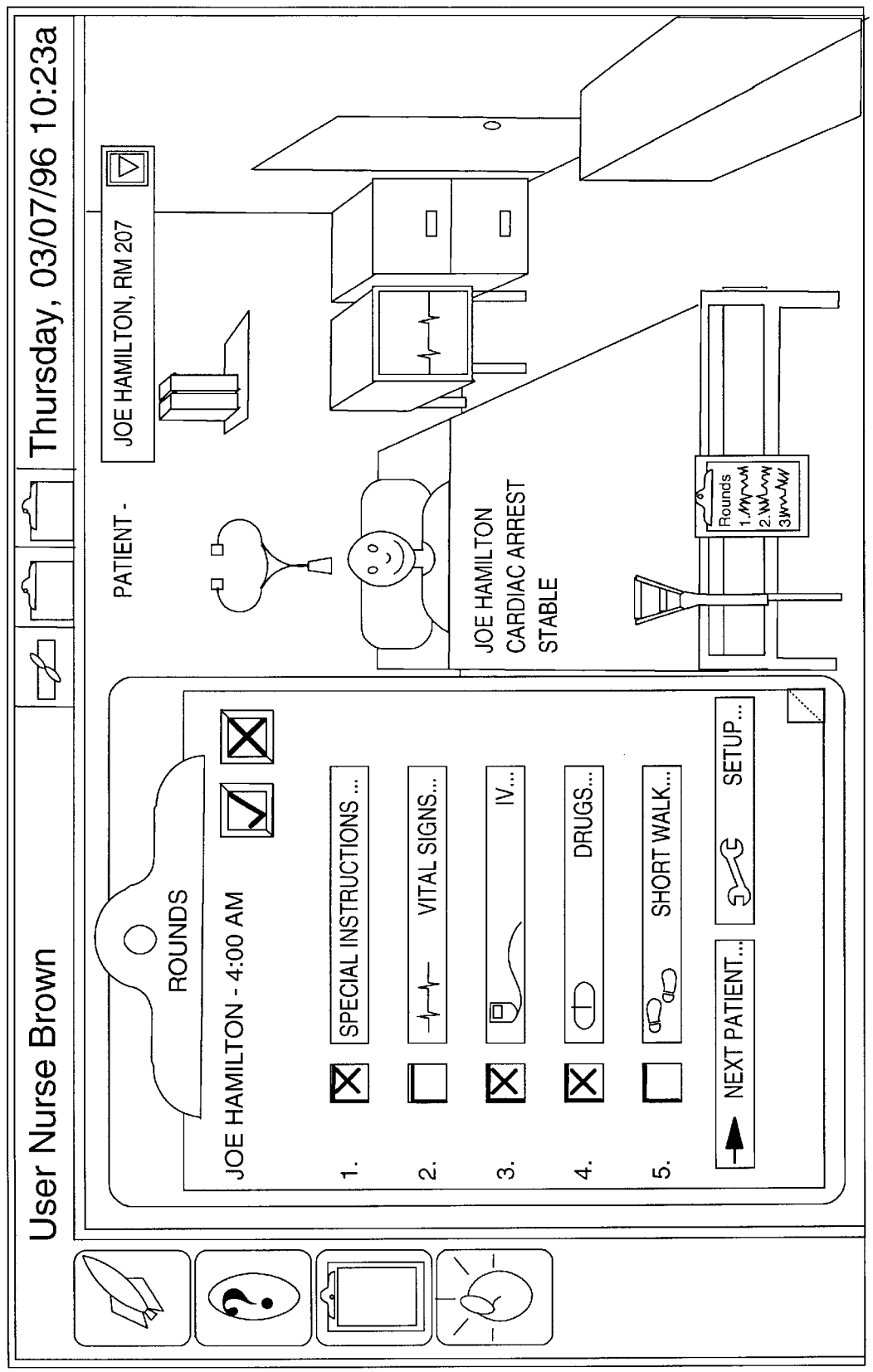
FIG. 6 is a screen capture of an alternative modified user interface according to the present invention for use in a medical environment.

In an example of a user interface providing security features, the user interface environments of FIGS. 4, 5 and 6, may be used to illustrate such an application. When the portable processor is located in a patient's room and the user interface environment of FIG. 5 is in use, because of privacy concerns about other patient's medical information, the user may not access information about other patients. However, when the portable processor is moved to a more secure location, such as the doctor's office, when the user selects the "Rounds" clipboard of FIG. 4, the user interface environment of FIG. 6 is activated. Because the portable data processor is located in a secure location, the user interface environment of FIG. 6 incorporates access for the user to select information for any patient by use of the pull-down patient menu of FIG. 6. Therefore, the portable data processor has both prevented access and allowed access to information based upon the acquired location of the portable data processor.

Figure 7:
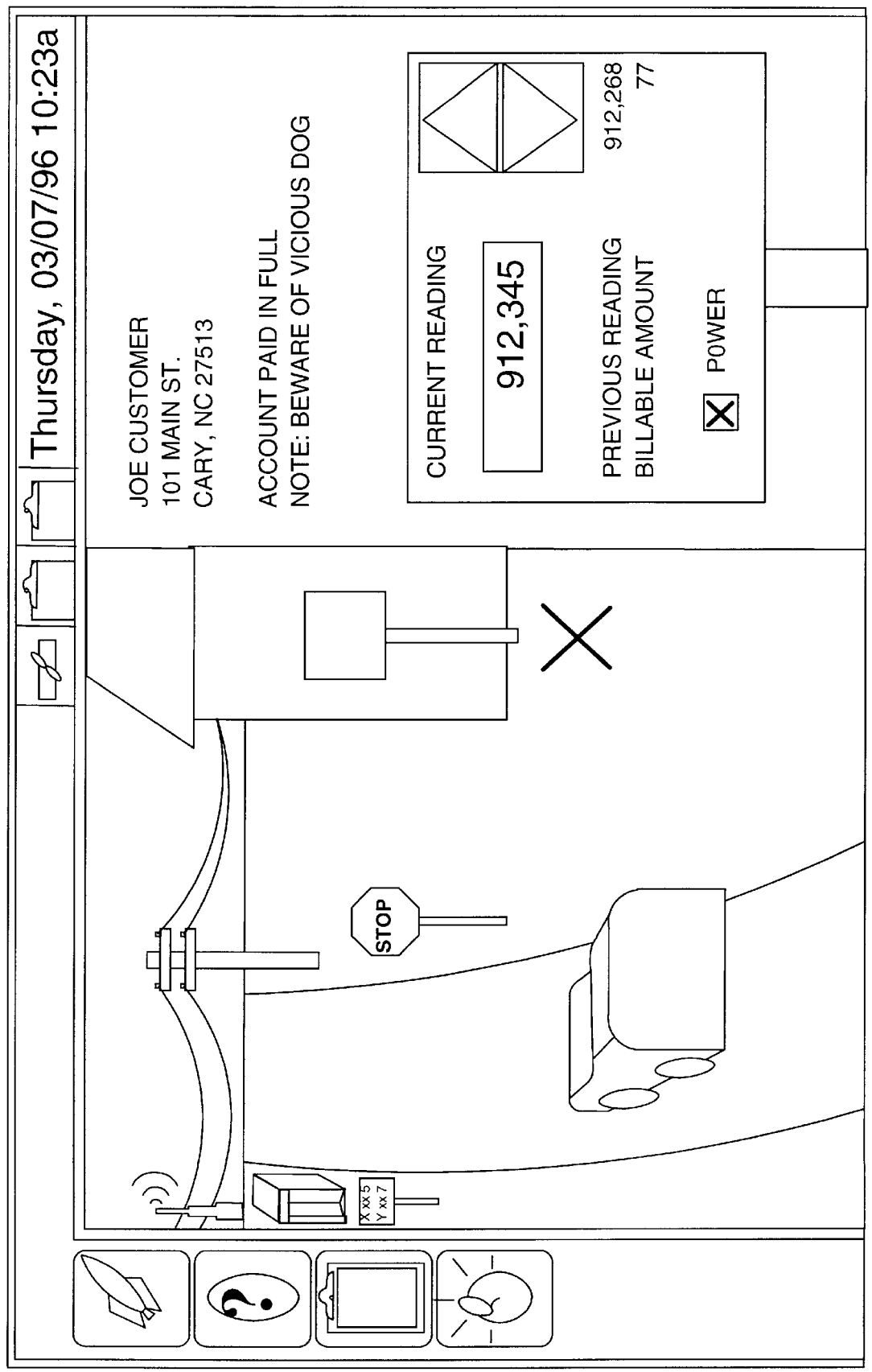
FIG. 7 is a screen capture of a first user interface according to the present invention for use in a utility environment.
Figure 8:
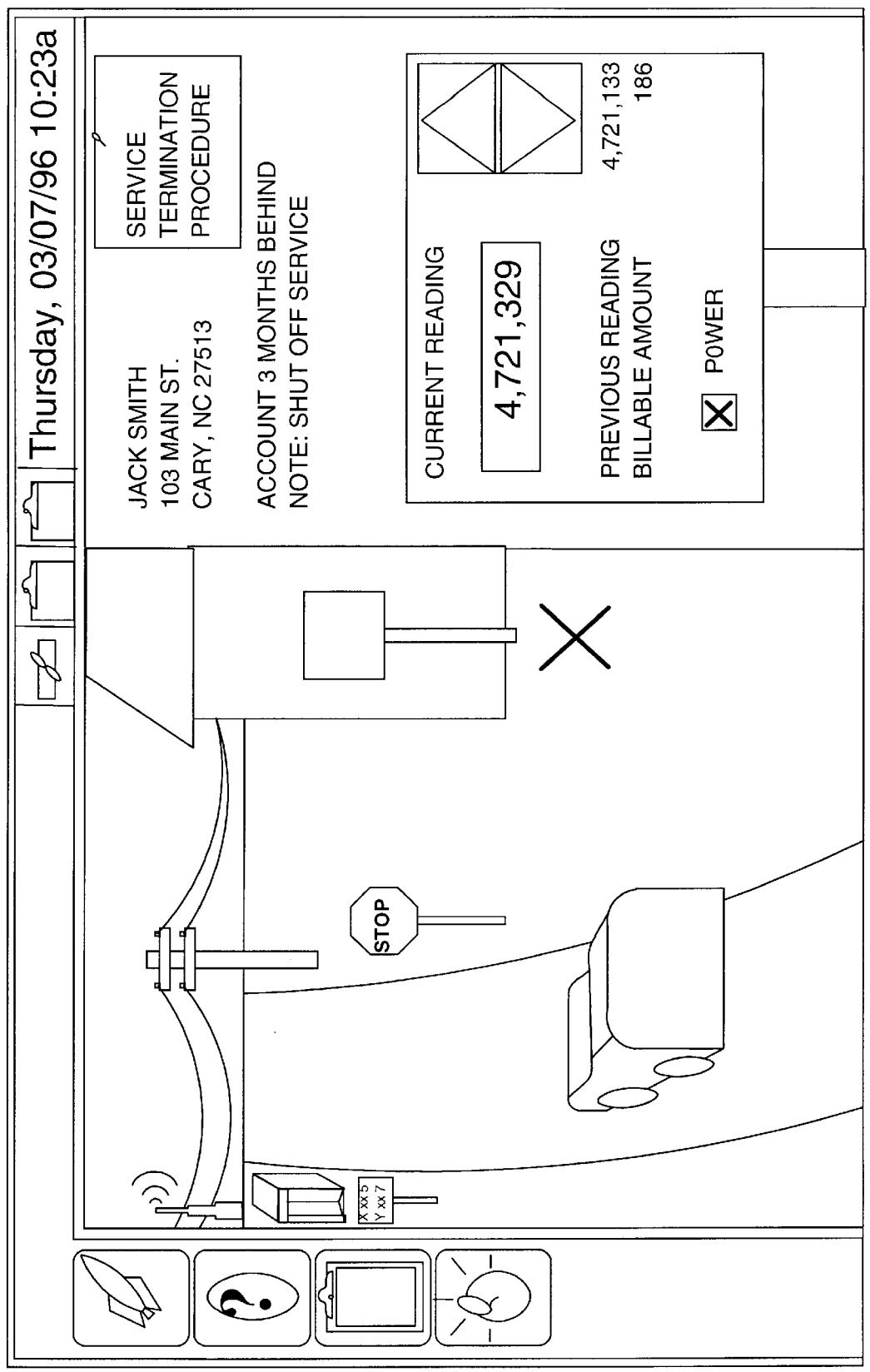
FIG. 8 is a screen capture of a modified user interface according to the present invention for use in a utility environment.
Figure 9:
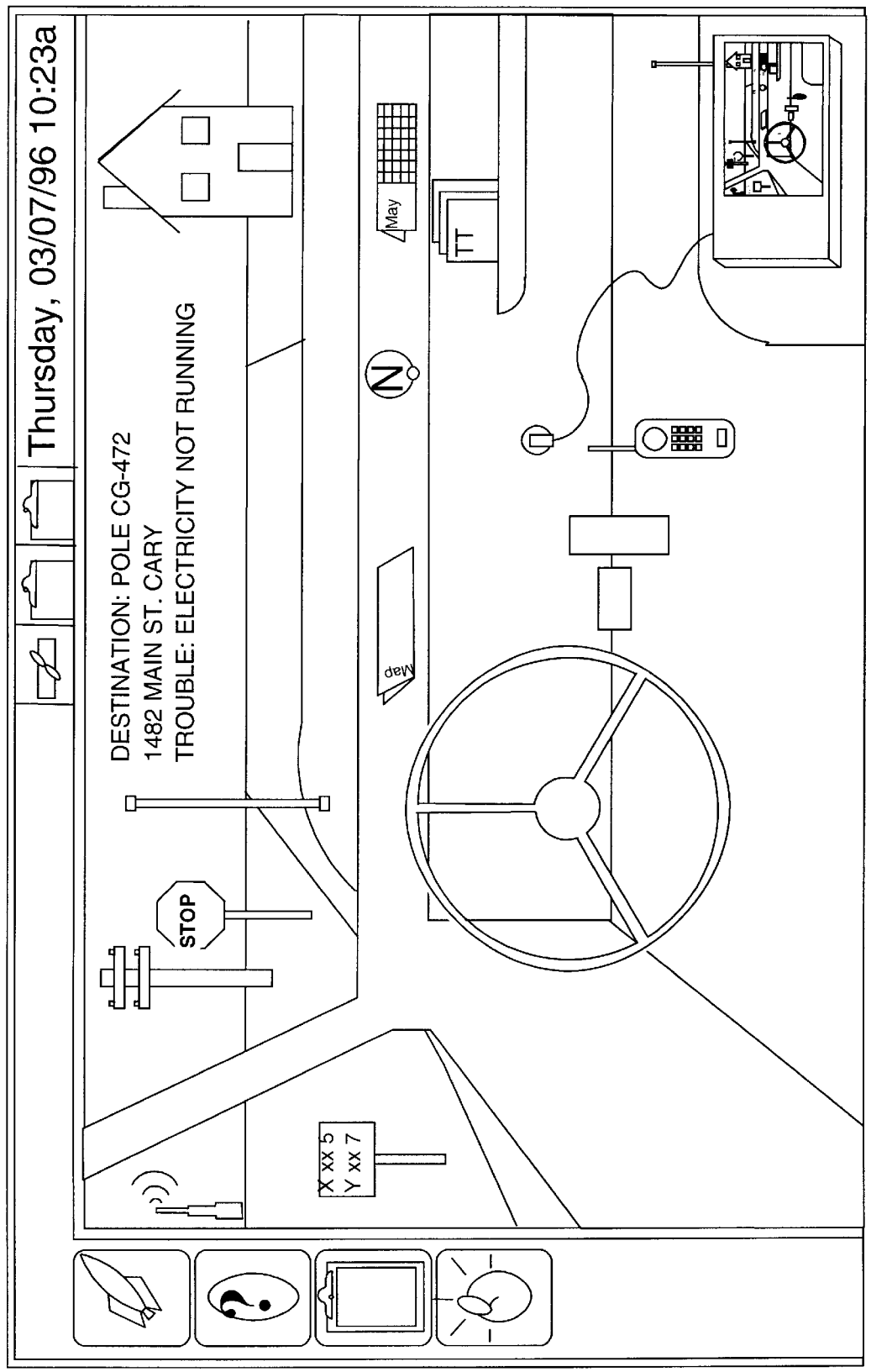
FIG. 9 is a screen capture of an alternative modified user interface according to the present invention for use in a utility environment.

FIGS. 7, 8, 9 and 10 illustrate another example of a location sensitive user interface according to the present invention. The user interface environments of FIGS. 7, 8, 9 and 10 are applicable to the utility field and may be used by a utility meter reader or repairman with a portable data processor. As seen in FIG. 7, when the portable data processor is stationary at a residence, a user interface environment appropriate to a residence is utilized. Thus, icons such as the utility meter are made accessible. When the portable data processor is in motion, such as in the utility vehicle, then the user interface environment of FIG. 9 is utilized and applications and data appropriate for use in a vehicle are made accessible and the applications and data for a residence are made less accessible. As seen in FIG. 9, in the motion user interface environment icons for the map, cellular phone and compass applications are made more accessible to the user. This user interface environment could also be the default user interface environment such that if a location does not have a specified user interface environment then the user interface environment of FIG. 9 is utilized.

Figure 10:
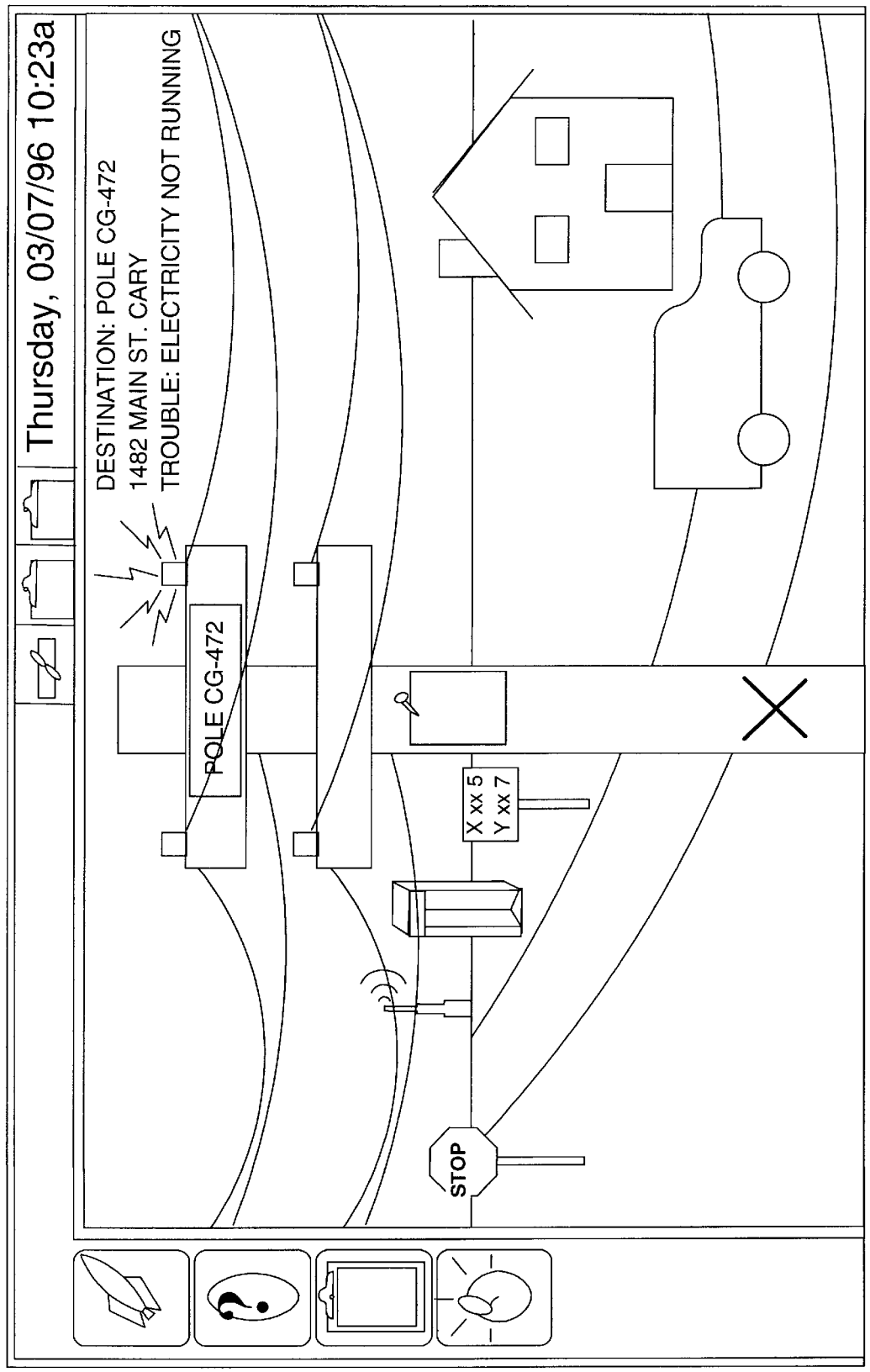
FIG. 10 is a screen capture of a second alternative modified user interface according to the present invention for use in a utility environment.

When the portable data processor is no longer in motion, which may be determined by the velocity of the data processor being below a predefined threshold for a predefined time period to filter out momentary interruptions in motion such as those caused by traffic or a stop light, the user interface environment based upon the acquired location of the portable data processor is utilized. The portable data processor could utilize the user interface environment described above with respect to FIG. 7 if the portable data processor is located at a residence or could utilize the user interface environment shown in FIG. 10 if the portable data processor is located at a utility pole. Furthermore, location sensitive data, such as the name of the owner of the residence (as shown in FIG. 7) or the designator of a utility pole (as shown in FIG. 10) may be made available based upon the acquired location.

FIG. 8 is an example of a user interface environment which has been modified based upon historical use of an application or data at a location. As seen in FIG. 8, the residence user interface environment of FIG. 7 has been modified to include an icon for a "Service Termination Procedure." By selecting this icon the user is presented with information about how to terminate a customers utilities. This icon was incorporated in the user interface environment as a result of the series of events described below.

Previously, when the portable data processor was at the location of the Jack Smith residence, the utility service was terminated at that residence. The user interface environment utilized on that previous occasion would be the user interface environment illustrated in FIG. 7. On that occasion, the user selected the "sign post" icon to obtain the termination procedure.

On a subsequent visit to the Jack Smith residence, the user interface environment of FIG. 8 is utilized because of the previous request for the termination procedure information. The "Service Termination Procedure" icon is incorporated in the user interface environment and made more accessible as a result of the historical use at the Smith location of the termination procedure information.

Alternatively, the user interface environment of FIG. 7 could be modified based upon historical use in combination with location sensitive data. For example, the "Service Termination Procedure" icon of FIG. 8 could be made more accessible based upon prior use at a location and information that the resident has not payed its utility bills for a specified period of time. Otherwise, despite its prior use at a location, the "Service Termination Procedure" would not be made more accessible if the resident was current in its bills.

As will be appreciated by those of skill in this art, the preceding examples are provided, not to limit or define the scope of the present invention, but to illustrate the nature of the present invention and possible uses for the teachings of the present invention. These examples may be modified in many different ways while still obtaining the benefits of the teachings of the present invention.

In the drawings, specification and examples, there have been disclosed typical preferred embodiments of the invention and, although specific terms are employed, these terms are used in a generic and descriptive sense only and not for purposes of limitation, the scope of the invention being set forth in the following claims.

That which is claimed is:

1. A method of providing a user interface environment for a portable data processor, the method comprising the steps of:

acquiring a geographic location of the portable data processor;

selecting a user interface environment associated with the acquired location of the portable data processor; and activating the selected user interface environment as the user interface environment of the portable data processor wherein the user interface environment comprises a graphical user interface environment having icons associated with software applications and wherein said selecting step comprises selecting a preselected group of application icons associated with the acquired location of the portable data processor as the user interface environment associated with the acquired location of the portable data processor and wherein said activating step comprises incorporating in the graphical user interface the selected preselected group of application icons associated with the acquired location of the portable data processor.

2. A method according to claim 1 wherein the selecting step is predicated by the step of:
   determining if the portable data processor is in motion; and
   wherein said selecting step comprises the step of selecting a user interface environment associated with the portable data processor being in motion and associated with the acquired location of the portable data processor.

3. A method according to claim 1 wherein said acquiring step comprises the step of accepting user input specifying the location of the portable data processor.

4. A method according to claim 1 wherein said acquiring step comprises the step of acquiring the location of the portable data processor through an automated position sensing system.

5. A method according to claim 1 wherein said acquiring step comprises the step of acquiring the location of the portable data processor through a global positioning system.

6. A method according to claim 1 further comprising the step of providing location sensitive data based upon the acquired location of the portable data processor.

7. A method according to claim 1 further comprising the step of associating a user interface environment with a location based upon a historical use of software applications at the specific location.

8. A method according to claim 1 further comprising the step of preventing activation of a user interface environment based upon the acquired location of the portable data processor.

9. A method according to claim 1 wherein said selecting step comprises selecting a software application as the user interface environment associated with the acquired location of the portable data processor and wherein said activating step comprises launching an instance of the selected software application.

10. A method of providing a user interface environment for a portable data processor, the method comprising the steps of:
    determining if the portable data processor is in motion;
    selecting a user interface environment associated with the portable data processor being in motion; and
    activating the selected user interface environment as the user interface environment of the portable data processor wherein the user interface environment comprises a graphical user interface environment having icons associated with software applications and wherein said selecting step comprises selecting a preselected group of application icons associated with the portable data processor being in motion as the user interface environment associated with the portable data processor being in motion and wherein said activating step comprises incorporating in the graphical user interface the selected preselected group of application icons associated with the portable data processor being in motion.

11. A method according to claim 10 wherein said determining step comprises the step of accepting user input specifying the if the portable data processor is in motion.

12. A method according to claim 10 wherein said determining step comprises the step of determining if the portable data processor is in motion through an automated position sensing system.

13. A method according to claim 10 wherein said determining step comprises the step of determining if the portable data processor is in motion through a global positioning system.

14. A method according to claim 10 further comprising the step of providing location sensitive data based upon the portable data processor being in motion.

15. A method according to claim 10 further comprising the step of associating a user interface environment with the portable data processor being in motion based upon a historical use of software applications while the processor was in motion.

16. A method according to claim 10 further comprising the step of preventing activation of a user interface environment based upon the portable data processor being in motion.

17. A method according to claim 10 wherein said selecting step comprises selecting a software application as the user interface environment associated with the portable data processor being in motion and wherein said activating step comprises launching an instance of the selected software application.

18. A data processing system comprising:
    a portable data processor;
    means for acquiring a geographic location of said portable data processor;
    means for selecting a user interface environment associated with the acquired location of said portable data processor; and
    means for activating the selected user interface environment as the user interface environment of said portable data processor wherein the user interface environment comprises a graphical user interface environment having icons associated with software applications and wherein said selecting step comprises selecting a preselected group of application icons associated with the acquired location of the portable data processor as the user interface environment associated with the acquired location of the portable data processor and wherein said activating step comprises incorporating in the graphical user interface the selected preselected group of application icons associated with the acquired location of the portable data processor.

19. A data processing system according to claim 18 further comprising:
    means for determining if said portable data processor is in motion; and
    wherein said means for selecting comprises means for selecting a user interface environment associated with said portable data processor being in motion and associated with the acquired location of said portable data processor.

20. A data processing system according to claim 18 wherein said means for acquiring comprises means for accepting user input specifying the location of said portable data processor.

21. A data processing system according to claim 18 wherein said means for acquiring comprises means for acquiring the location of said portable data processor through an automated position sensing system.

22. A data processing system according to claim 18 wherein said means for acquiring comprises means for acquiring the location of said portable data processor through a global positioning system.

23. A data processing system according to claim 18 further comprising means for providing location sensitive data based upon the acquired location of said portable data processor.

24. A data processing system according to claim 18 further comprising means for associating a user interface environment with a location based upon a historical use of software applications at the specific location.

25. A data processing system according to claim 18 further comprising means for preventing activation of a user interface environment based upon the acquired location of said portable data processor.

26. A data processing system according to claim 18 wherein said means for selecting comprises means for selecting a software application as the user interface environment associated with the acquired location of said portable data processor and wherein said means for activating comprises means for launching an instance of the selected software application.

27. A data processing system comprising:
a portable data processor:
means for determining if said portable data processor is in motion;
means for selecting a user interface environment associated with said portable data processor being in motion; and
means for activating the selected user interface environment as the user interface environment of said portable data processor wherein the user interface environment comprises a graphical user interface environment having icons associated with software applications and wherein said selecting step comprises selecting a preselected group of application icons associated with the portable data processor being in motion as the user interface environment associated with the portable data processor being in motion and wherein said activating step comprises incorporating in the graphical user interface the selected preselected group of application icons associated with the portable data processor being in motion.

28. A data processing system according to claim 27 wherein said means for determining comprises means for accepting user input specifying if said portable data processor is in motion.

29. A data processing system according to claim 27 wherein said means for determining comprises means for determining if said portable data processor is in motion through an automated position sensing system.

30. A data processing system according to claim 27 wherein said means for determining comprises means for determining if said portable data processor is in motion through a global positioning system.

31. A data processing system according to claim 27 further comprising means for providing location sensitive data based upon said portable data processor being in motion.

32. A data processing system according to claim 27 further comprising means for associating a user interface environment with said portable data processor being in motion based upon a historical use of software applications while said processor was in motion.

33. A data processing system according to claim 27 further comprising means for preventing activation of a user interface environment based upon said portable data processor being in motion.

34. A data processing system according to claim 27 wherein said means for selecting comprises means for selecting a software application as the user interface environment associated with said portable data processor being in motion and wherein said means for activating comprises means for launching an instance of the selected software application.

35. A computer program product for providing a user interface for a portable data processor, the computer program product comprising:
a computer-readable storage medium having computer-readable program code means embodied in said medium, said computer-readable program code means comprising:
computer instruction means for acquiring a geographic location of the portable data processor;
computer instruction means for selecting a user interface environment associated with the acquired location of the portable data processor; and
computer instruction means for activating the selected user interface environment as the user interface environment of the portable data processor wherein the user interface environment comprises a graphical user interface environment having icons associated with software applications and wherein said selecting step comprises selecting a preselected group of application icons associated with the acquired location of the portable data processor as the user interface environment associated with the acquired location of the portable data processor and wherein said activating step comprises incorporating in the graphical user interface the selected preselected group of application icons associated with the acquired location of the portable data processor.

36. A computer program product according to claim 35 further comprising:
computer instruction means for determining if the portable data processor is in motion; and
wherein said computer instruction means for selecting comprises computer instruction means for selecting a user interface environment associated with the portable data processor being in motion and associated with the acquired location of the portable data processor.

37. A computer program product according to claim 35 wherein said computer instruction means for acquiring comprises computer instruction means for accepting user input specifying the location of the portable data processor.

38. A computer program product according to claim 35 wherein said computer instruction means for acquiring comprises computer instruction means for acquiring the location of the portable data processor through an automated position sensing system.

39. A computer program product according to claim 35 wherein said computer instruction means for acquiring comprises computer instruction means for acquiring the location of the portable data processor through a global positioning system.

40. A computer program product according to claim 35 further comprising computer instruction means for providing context sensitive data based upon the acquired location of the portable data processor.

41. A computer program product according to claim 35 further comprising computer instruction means for associating a user interface environment with a location based upon a historical use of software applications at the specific location.

42. A computer program product according to claim 35 further comprising computer instruction means for preventing activation of a user interface environment based upon the acquired location of the portable data processor.

43. A computer program product according to claim 35 wherein said computer instruction means for selecting comprises computer instruction means for selecting a software application as the user interface environment associated with the acquired location of the portable data processor and wherein said computer instruction means for activating comprises computer instruction means for launching an instance of the selected software application.

44. A computer program product for providing a user interface for a portable data processor, the computer program product comprising:

a computer-readable storage medium having computer-readable program code means embodied in said medium, said computer-readable program code means comprising:

computer instruction means for determining if the portable data processor is in motion;

computer instruction means for selecting a user interface environment associated with the portable data processor being in motion; and computer instruction means for activating the selected user interface environment as the user interface environment of the portable data processor wherein the user interface environment comprises a graphical user interface environment having icons associated with software applications and wherein said selecting step comprises selecting a preselected group of application icons associated with the portable data processor being in motion as the user interface environment associated with the portable data processor being in motion and wherein said activating step comprises incorporating in the graphical user interface the selected preselected group of application icons associated with the portable data processor being in motion.

45. A computer program product according to claim 44 wherein said computer instruction means for determining comprises computer instruction means for accepting user input specifying if the portable data processor is in motion.

46. A computer program product according to claim 44 wherein said computer instruction means for determining comprises computer instruction means for determining if the portable data processor is in motion through an automated position sensing system.

47. A computer program product according to claim 44 wherein said computer instruction means for determining comprises computer instruction means for determining if the portable data processor is in motion through a global positioning system.

48. A computer program product according to claim 44 further comprising computer instruction means for providing location sensitive data based upon the portable data processor being in motion.

49. A computer program product according to claim 44 further comprising computer instruction means for associating a user interface environment with the portable data processor being in motion based upon a historical use of software applications while the processor was in motion.

50. A computer program product according to claim 44 further comprising computer instruction means for preventing activation of a user interface environment based upon the portable data processor being in motion.

51. A computer program product according to claim 44 wherein said computer instruction means for selecting comprises computer instruction means for selecting a software application as the user interface environment associated with the portable data processor being in motion and wherein said computer instruction means for activating comprises computer instruction means for launching an instance of the selected software application.

* * * * *